UNITED STATES PATENT OFFICE.

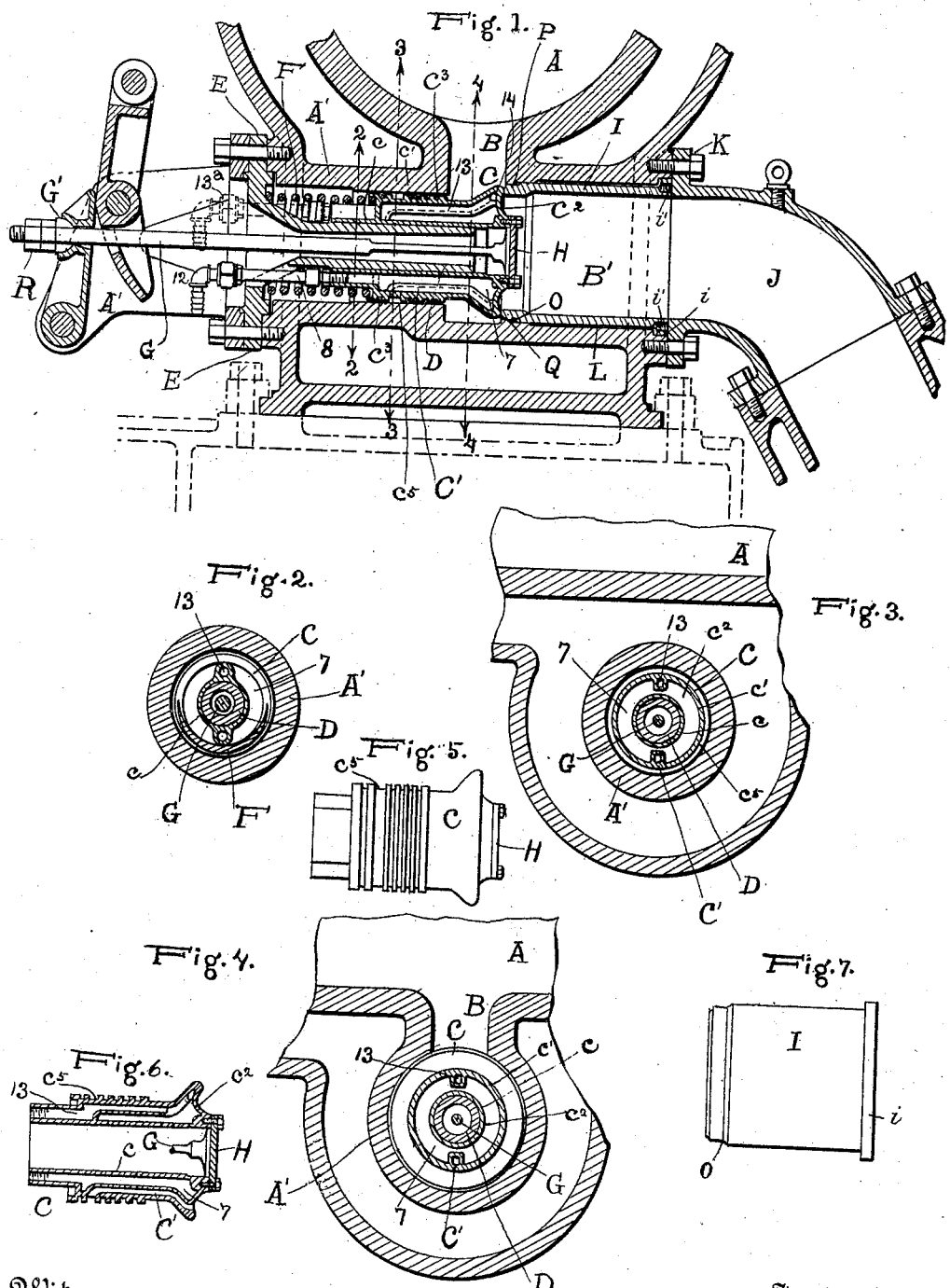

RUDOLF WINTZER, OF MILWAUKEE, WISCONSIN, ASSIGNOR TO POWER AND MINING MACHINERY COMPANY, OF NEW YORK, N. Y., A CORPORATION OF NEW JERSEY.

ENGINE-VALVE.

976,766.

Specification of Letters Patent.

Patented Nov. 22, 1910.

Application filed September 4, 1906. Serial No. 333,223.

*To all whom it may concern:*

Be it known that I, RUDOLF WINTZER, a subject of the Emperor of Germany, residing at Milwaukee, in the county of Milwaukee and State of Wisconsin, have invented certain new and useful Improvements in Engine-Valves, of which the following is a specification, reference being had therein to the accompanying drawing.

This invention relates to valves and their accompanying parts, especially to the exhaust valves of internal combustion engines.

The several objects of the invention, and the improved features of construction and their mode of operation, will be understood from the description given below, in connection with the drawings.

Figure 1 is a longitudinal section of a valve and of a part of an engine cylinder sufficient to illustrate the manner of applying and employing my improvements; Fig. 2 is a vertical section on the line 2—2, of Fig. 1; Fig. 3 is a section on the line 3—3, of Fig. 1; Fig. 4 is a section on the line 4—4, of Fig. 1; Fig. 5 is a view of the valve as a separate part. Fig. 6 is a longitudinal cross section of the same. Fig. 7 is a view of the tube forming the valve seat.

In the drawings I have shown a portion of the cylinder A of a gas engine. It has an exhaust duct B—B', which is controlled by a valve indicated as a whole by C. D is the bearing or support for the valve. The valve is seated against a tube or cylinder I, which is mounted in the part B' of the exhaust duct.

The valve C is hollow, being formed with an internal cylindrical part $c$, and an outer cylindrical part $c'$, and expanded at the end to form the valve proper, the end wall being indicated by $c^2$. Between the parts $c$, $c'$ and $c^2$ there is an inclosed water chamber. The inner cylindrical part $c$ is fitted snugly to the bearing D. At $c^3$ there is a packing interposed between the external part $c'$ of the valve and the wall metal at A' of the cylinder. The packing is applied in several planes transverse of the valve, in the form of rings or the like. At a suitable point between the ends of the series of packing elements there is a groove or duct $c^5$ which takes any exhaust gases that may work past the first of the packing elements, and this leaking gas is conducted through a duct C' to the exhaust duct at B'.

Water is admitted to the chamber 7 in the valve through the duct 8 and a coupling 12, which can be connected to a hose or other movable supply pipe. The water escapes from the valve chamber through the passage at 13, which communicates with the chamber through openings 14. The passage 13 has a coupler $13^a$ connected to a flexible or other movable exhaust duct. The outer end of the bearing or valve support D is expanded to form a flange or annulus E, which is bolted to the cylinder metal. In the chamber inside of this flange there is arranged the coil spring F, which bears against the valve, normally tending to hold it against its seat.

The valve is opened or withdrawn from its seat by the rod G passing centrally through the bearing or support D, this rod at the outer end being connected at G' to the valve gear. At its inner end it is secured by means of the disk or plate H to the end of the valve, the disk forming a tight closure for the central chamber in the valve, and also for the inner end of the bearing or support D.

The tube or cylinder I, which provides the seat for the valve, is extended to points at a considerable distance from the valve. It is held in place in such way that it can be readily removed endwise, any suitable retaining device being employed. As shown, it is prevented from displacement by the pipe or coupling J, through which the exhaust gases are taken. This is secured to the metal of the cylinder by bolts at K. The cylinder metal is provided with a cylindrical aperture or bore at L, into which the tube I is snugly fitted. At the outer end of the tube I there is a flange $i$ fitting in an annular cavity in the cylinder metal. In this flange or in the end of the metal of the tube there are formed sockets $i'$ adapted to receive a suitable tool capable of rotating the tube or withdrawing it from its seat when desired. At O the external surface of the tube or cylinder I is reduced, and this reduced part is fitted tightly to a rib or shoulder at P on the cylinder metal. The valve seat proper is at Q, this being the end face of the tube or cylinder I, and adapted to receive tightly the end of the valve C.

The external diameter of the sleeve or tube I is somewhat greater than the diameter of the valve, and consequently when it is desired to remove the valve it can be done by releasing the bolts at K and the nuts at R, after which the valve can be drawn endwise in the direction of the exhaust duct. I obviate therefore the necessity of removing any of the valve gear proper or disconnecting any of the ducts which supply or withdraw the cooling water for the valve, and also obviate the taking out of any parts of the valve casing. One or all of these matters have been incident to the parts that have heretofore been used in engines of this sort; much time has been consumed, special care has been required for readjusting the gear, and re-packing the water connections and the like work.

If it is necessary to grind the valve, all that is required, with the construction which I have shown and described, is to remove the exhaust pipe and the coupling, for then access can be had to the tube or cylinder I which carries the valve seat, and to the valve itself, and the grinding can be accomplished in any preferred way, as for instance by rotating the tube I with the seat. This tube or bushing I is guided during the grinding manipulation in the guides at its ends. The ground faces on the valve seat are easily accessible for inspection, cleansing and the like.

One of the important matters incident to the present improvements is that by having the parts constructed and related in the way described I do away with the tubular part around the valve proper which has been heretofore necessary and has been called the "liner". It is of the nature of a cylinder or bushing inserted into the aperture in the cylinder metal on the side where the valve gear is situated, and has an external diameter somewhat greater than that of the valve. One form of such a valve mounting is illustrated in my earlier application, Serial No. 318,495, filed May 24, 1906. By employing a tube or bushing for the valve seat, such as shown at I, I obviate entirely the necessity of this liner tube on the opposite side of the cylinder.

What I claim is:—

1. In a gas engine, exhaust devices comprising an exhaust pipe, an exhaust valve, a sleeve or tube fitting within said pipe and providing a seat for the valve, said exhaust pipe having a removable section to permit of the withdrawal of said sleeve from in front of the valve, independently of the valve.

2. In a gas engine, exhaust devices comprising an exhaust pipe, an exhaust valve, a sleeve or tube fitting within said pipe and providing a seat for the valve, said exhaust pipe having a removable elbow to permit of the withdrawal of said sleeve from in front of the valve, independently of the valve.

3. In a gas engine, exhaust devices comprising an exhaust pipe, an exhaust valve, a sleeve or tube fitting within said pipe and rotatable therein and providing a seat for the valve, said exhaust pipe having a removable section to permit of the withdrawal of said sleeve from in front of the valve, independently of the valve.

4. In a gas engine, exhaust devices comprising an exhaust pipe, an exhaust valve, a sleeve or tube fitting within said pipe and providing a seat for the valve and having an outside diameter greater than the outside diameter of the valve and said exhaust pipe having a removable section to permit of the withdrawal of said sleeve from in front of the valve, independently of the valve.

5. In a gas engine, exhaust devices comprising an exhaust pipe, an exhaust valve, a sleeve or tube fitting within said pipe and providing a seat for the valve, said exhaust pipe having a removable section adapted to hold said sleeve in position or permit the withdrawal of said sleeve from in front of the valve, independently of the valve.

6. In a valve mechanism for explosive engines, the combination of the valve, the means for supporting and guiding the valve, the exhaust pipe, a tube or ring providing a seat for the valve, and mounted in a section of the exhaust pipe, and a removable section of the exhaust pipe adjacent to the aforesaid section, the valve being adapted to be removed from its support by withdrawing it through the chamber occupied by the seat tube or ring, substantially as set forth.

7. The combination of the valve, means for supporting and guiding the valve, and a tube or ring having a metallic seat for the valve, and adapted to be rotated while in contact with the valve when in working position, substantially as set forth.

8. In a gas engine, exhaust devices comprising an exhaust pipe, an exhaust valve, a sleeve or tube fitting within said pipe and rotatable therein and provided with means for receiving a tool by which such rotation can be effected and providing a seat for the valve, said exhaust pipe having a removable section to permit of the withdrawal of said sleeve from in front of the valve, independently of the valve.

9. In an exhaust valve mechanism for gas engines, the combination with the exhaust valve, of a sleeve or tube against which the valve abuts, a socket within which said sleeve or tube is rotatably mounted, and means for holding said sleeve or tube in position, or for releasing it, whereby it can be moved independently of the valve, substantially as set forth.

10. In a gas engine, exhaust devices comprising an exhaust pipe, an exhaust valve, a sleeve or tube fitting within said pipe and providing a seat for the valve, and having a machined fit with the interior cylindrical surface of the exhaust pipe at that end which is the seat for the valve, said exhaust pipe having a removable section to permit of the withdrawal of said sleeve from in front of the valve, independently of the valve.

11. In a gas engine, exhaust devices comprising an exhaust pipe, an exhaust valve, a sleeve or tube providing a seat for the valve and having a machined cylindrical fit with the interior surface of the exhaust pipe at each of its ends, said exhaust pipe having a removable section to permit of withdrawal of said sleeve from in front of said valve, independently of the valve.

12. In a gas engine, exhaust devices comprising an exhaust pipe, an exhaust valve, a sleeve or tube fitting within the pipe and providing a seat for the valve, said exhaust pipe having a removable section which is bolted to that part of the exhaust pipe within which the said sleeve is contained, the removable section being adapted to hold the sleeve longitudinally to position against the blows of the valve and to permit of the withdrawal of said sleeve from in front of the valve, independently of the valve.

13. In a gas engine, exhaust devices comprising an exhaust pipe, an exhaust valve, a sleeve or tube fitting within said pipe and providing a seat for the valve, the exhaust pipe having a bend next beyond the said sleeve or tube, said bent portion of the pipe being a removable section adapted to permit of the withdrawal of the sleeve from in front of the valve, independently of the valve along its longitudinal axis without interference with the more remote parts of the exhaust pipe.

In testimony whereof I affix my signature, in presence of two witnesses.

RUDOLF WINTZER.

Witnesses:
L. F. SNYDER,
F. G. BECKER.